United States Patent
Schneider et al.

(10) Patent No.: US 9,905,058 B2
(45) Date of Patent: Feb. 27, 2018

(54) WORKSHOP DIAGNOSTIC SYSTEM

(71) Applicant: Robert Bosch GmbH, Stuttgart (DE)

(72) Inventors: Klaus Schneider, Ludwigsburg (DE);
Mirko Wagner, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/901,126

(22) PCT Filed: May 27, 2014

(86) PCT No.: PCT/EP2014/060905
§ 371 (c)(1),
(2) Date: Dec. 28, 2015

(87) PCT Pub. No.: WO2014/206674
PCT Pub. Date: Dec. 31, 2014

(65) Prior Publication Data
US 2016/0148443 A1  May 26, 2016

(30) Foreign Application Priority Data

Jun. 27, 2013  (DE) .................. 10 2013 212 505

(51) Int. Cl.
*G07C 5/00* (2006.01)
*G05B 23/02* (2006.01)
*G07C 5/08* (2006.01)

(52) U.S. Cl.
CPC ......... *G07C 5/008* (2013.01); *G05B 23/0213* (2013.01); *G07C 5/0808* (2013.01); *G07C 2205/02* (2013.01)

(58) Field of Classification Search
None
See application file for complete search history.

(56) References Cited

U.S. PATENT DOCUMENTS 7,809,482 B2 * 10/2010 Bertosa ............... G07C 5/008
340/438
8,930,064 B2 * 1/2015 Merg .................. G07C 5/008
701/29.1
(Continued)

FOREIGN PATENT DOCUMENTS

CN   1735848 A   2/2006
CN   101514942 A  8/2009
(Continued)

OTHER PUBLICATIONS

International Search Report for PCT/EP2014/060905, issued on Aug. 5, 2014.

*Primary Examiner* — Redhwan K Mawari
*Assistant Examiner* — Edward Torchinsky
(74) *Attorney, Agent, or Firm* — Norton Rose Fulbright US LLP; Herard Messina

(57) ABSTRACT

A method for supporting the troubleshooting on a technical object, in particular on a motor vehicle, includes receiving first diagnostic data from at least one object control device and transmitting the data to a diagnostic server; forming, from particular transmitted first diagnostic data, at least one set of first diagnostic data and assigning at least one first diagnostic result to the set of first diagnostic data; storing the first diagnostic data sets generated in the course of successive diagnoses in a first database; comparing the diagnostic data and/or the diagnostic result of each diagnostic data set of the first diagnostic data sets with the diagnostic data and/or the diagnostic result of predefined second diagnostic data sets, which are stored in a second database and each of which contains a set of second diagnostic data and a second diagnostic result assigned to the set of second diagnostic data.

16 Claims, 2 Drawing Sheets

(56) References Cited

U.S. PATENT DOCUMENTS

| | | | |
|---|---|---|---|
| 2002/0007237 A1* | 1/2002 | Phung | G05B 23/0216 |
| | | | 701/31.4 |
| 2013/0110344 A1 | 5/2013 | Merg et al. | |
| 2016/0148443 A1* | 5/2016 | Schneider | G07C 5/0808 |
| | | | 701/31.4 |

FOREIGN PATENT DOCUMENTS

| | | |
|---|---|---|
| CN | 102200487 A | 9/2011 |
| DE | 102011076378 | 11/2012 |
| DE | 102011086352 | 12/2012 |

* cited by examiner

WORKSHOP DIAGNOSTIC SYSTEM

FIELD OF THE INVENTION

The present invention relates to a workshop diagnostic system, in particular a workshop diagnostic system for a motor vehicle workshop, which is capable of providing vehicle-specific suggestions for repair and/or diagnosis.

BACKGROUND INFORMATION

Troubleshooting in motor vehicles is one task of motor vehicle workshops. For this purpose, the workshops frequently use so-called diagnostic testers as a technical aid. One task of a diagnostic tester is to communicate with control devices installed in the motor vehicle and read out their fault memory, and another task is to support the troubleshooting. A diagnostic tester is desirable, which supports the mechanic in the troubleshooting, in that the diagnostic tester names possibly defective components and/or generates suggestions for further test steps on the basis of symptoms, fault memory entries, and the tests already carried out on the motor vehicle. The basis for such a functionality of the diagnostic tester is the knowledge of cause-effect relationships between a defective component in the motor vehicle and the effects of the defect on symptoms, fault memory entries, and test results of testing procedures.

One example of a diagnostic system of the type which enables guided troubleshooting is described in German Published Patent Application No. 10 2011 086 352. Workshop experts ("authors") must maintain the knowledge stored in the diagnostic tester regarding the aforementioned cause-effect relationships between a defective component in the motor vehicle and the effects of the defect on symptoms, fault memory entries, and test results of testing procedures on the basis of their treasure trove of experience. Due to the plurality of makes and variants of motor vehicles, a great deal of effort is required for the authors to manually generate the necessary knowledge base.

Franchised workshops must utilize the diagnostic systems of the particular motor vehicle manufacturer. Guided troubleshooting is based, on the one hand, on the knowledge of diagnostic authors, and on the other hand on empirical knowledge, in that the manufacturers build up case databases, for example, in the form of technical service bulletins, and make these available to the workshops. The two approaches for supporting the mechanic are independent of one another, however.

Case-based databases are becoming established to an increasing extent in the manufacturer-independent "independent aftermarket (IAM)". The suppliers gather a plurality of repair cases and offer workshops access to their databases, against payment, so that the workshops may research similar cases.

The quality of a diagnostic system for the IAM, which is based solely on case databases, is highly dependent on the actual numbers of cases per motor vehicle and on the overall picture of symptoms. Case-based systems make it possible to reliably detect typical problems on motor vehicles given a suitable number of cases. Due to the plurality of makes and model variants, the actual number of cases, except with respect to mass-produced vehicles, is often small, so that the variance of the suggested causes and defective components is high and, therefore, the desired reliability of the suggestions cannot always be realized.

Building up diagnostic systems for the IAM with the aid of author knowledge is difficult and expensive, on the one hand, due to the plurality of makes and variants, and, in addition, is dependent on the treasure trove of experience of the involved authors. Typical problems of a motor vehicle may be overlooked due to lack of experience on the part of the involved authors, but the reliability and variance of the repair suggestions is high.

SUMMARY

One object of the present invention is to provide an improved diagnostic system, which avoids the disadvantages of the previously described approaches.

A workshop diagnostic system according to the present invention for supporting the troubleshooting on a technical object, in particular on a motor vehicle, includes at least one diagnostic tester and at least one diagnostic server, the diagnostic tester including at least one object communication device and at least one transmission device.

The object communication device is designed for receiving first diagnostic data from at least one object control device of the technical object, and the transmission device is designed for transmitting the first diagnostic data to the diagnostic server. Not necessarily all the data gathered by the diagnostic tester are required for carrying out a diagnosis. In particular, diagnoses are possible for which a portion of the data gathered by the diagnostic tester is not relevant. The diagnostic tester and/or the diagnostic server is/are therefore designed for forming, from the first diagnostic data, at least one set of first diagnostic data, which includes a portion or all of the first diagnostic data, and for assigning at least one first diagnostic result to the set of first diagnostic data formed in this way.

The workshop diagnostic system also includes a first, a second, and a third database. The first database is provided for storing first diagnostic data sets generated in the course of successive diagnoses, each of the first diagnostic data sets including a particular set of first diagnostic data and the at least one first diagnostic result assigned to the set of first diagnostic data. The second database is designed for storing predefined second diagnostic data sets, each of the second diagnostic data sets including a particular set of second diagnostic data and a second diagnostic result assigned to the set of second diagnostic data.

The workshop diagnostic system also has an evaluation system, including an assignment unit, which is designed for comparing the diagnostic data and/or the diagnostic result of one of the first diagnostic data sets with the diagnostic data and/or the diagnostic result of the predefined second diagnostic data sets and for assigning to the particular first diagnostic data set one of the predefined second diagnostic data sets having the greatest similarity to the particular first diagnostic data set according to the comparison. The workshop diagnostic system also includes a memory unit, which is designed for storing the assignment carried out by the assignment unit, and a data set generating unit, which is designed for modifying the particular assigned second diagnostic data set on the basis of all first diagnostic data sets which are assigned to this second diagnostic data set, in order to generate at least one third diagnostic data set and to store the third diagnostic data set in the third database. The third diagnostic data set includes a particular set of third diagnostic data and at least one third diagnostic result assigned to the set of third diagnostic data. The workshop diagnostic system is designed in such a way that a support of the troubleshooting on the technical object is based on the at least one third diagnostic data set.

The present invention also relates to a method for supporting the troubleshooting on a technical object, in particular on a motor vehicle, the method including the following steps: receiving first diagnostic data from at least one object control device and transmitting the data to a diagnostic server; forming, from particular transmitted first diagnostic data, at least one set of first diagnostic data, which includes at least a portion of the first diagnostic data, and assigning to the set of first diagnostic data at least one first diagnostic result; storing the first diagnostic data sets generated in the course of successive diagnoses in a first data base, each of the first diagnostic data sets including a particular set of first diagnostic data and the at least one first diagnostic result assigned to the set of first diagnostic data; comparing the diagnostic data and/or the diagnostic result of each of the first diagnostic data sets with the diagnostic data and/or the diagnostic result of predefined second diagnostic data sets, which are stored in a second database and each contain a set of second diagnostic data and a second diagnostic result assigned to the set of second diagnostic data, and assigning to the particular first diagnostic data set one of the predefined second diagnostic data sets having the greatest similarity to the particular first diagnostic data set according to the comparison; storing the assignment carried out by the assignment unit; modifying the particular assigned second diagnostic data set on the basis of all first diagnostic data sets assigned to this second diagnostic data set in order to generate at least one third diagnostic data set, the third diagnostic data set containing a particular set of third diagnostic data and at least one third diagnostic result assigned to the set of third diagnostic data; and storing the third diagnostic data set in a third database. Finally, the method also includes basing the support of the troubleshooting on the technical object on at least one third diagnostic data set.

A basic idea of the present invention is therefore the combination of feedback data from the first database ("case database"), which are gathered in the course of carrying out vehicle diagnoses, with data from the second database ("author database"), which have been compiled by human authors. As compared to purely case-based diagnostic systems, this combination of data having different origins avoids a high variance of the suggested diagnoses and further test steps, which would otherwise occur, in particular, when the number of cases is small; but also makes it possible, with the aid of the evaluation of the case-based data in the first database, to detect faults in vehicles, which prove to be "typical" for the particular vehicle type due to a high number of cases, but which have not been anticipated by the human authors.

In addition, the described method for selecting a model for the cause-effect relationships is advantageous because an attempt is not made to develop a purely empirical model from the case data, which, due to a small number of cases, results in the statistical problem of the "curse of dimensionality" and therefore erroneously guesses cause-effect relationships which may not be present. Instead, proceeding from the authors' knowledge stored in the second database, small changes are tested and are statistically analyzed on the basis of the cases stored in the first database.

In one specific embodiment, the first, second, and third diagnostic data each include at least one diagnostic variable and at least one value assigned to the diagnostic variable. In this way, the diagnostic data may include various types of measured values (temperature, pressure, etc.), to each of which at least one specific measured value or a range of measured values is assigned.

The assignment unit and/or the data set generating unit is/are designed in such a way that numerical differences between values of corresponding diagnostic data of the particular data sets to be processed are calculated and the assignment of a first diagnostic data set to a second diagnostic data set and/or the modification of a second diagnostic data set is carried out on the basis of the thus calculated numerical differences, corresponding diagnostic data being diagnostic data which contain the same diagnostic variables.

In this case, the assignment unit and/or the data set generating unit is/are designed, in particular, for calculating a numerical difference between the diagnostic results of the two data sets on the basis of a predefined metric, which defines a numerical distance between two diagnostic results in each case.

In this way, a numerical distance between two diagnostic results may be defined, it being possible to weight the various variables within the diagnostic data differently. In particular, a suitably, for example in the form of a table, defined metric makes it possible to define a numerical distance between non-numerical diagnostic data and, in particular, diagnostic results.

The assignment unit and/or the data set generating unit may be designed for calculating a mean of the numerical differences as the comparative value in each case, in order to calculate, in this way, a numerical distance, which is expressed as a single digit, between two data sets. The mean may be, in particular, a weighted mean, which makes it possible to weight the individual diagnostic data differently according to their relevance.

In one specific embodiment, the data set generating unit is designed for generating the third diagnostic data set on the basis of the assigned second diagnostic data set and for changing at least one value of at least one diagnostic variable in the second diagnostic data set as a function of a modification data set, which has been ascertained from all the first data sets assigned to the second diagnostic data set, for removing at least one diagnostic variable from the second diagnostic data set, and/or for adding at least one diagnostic variable to the second diagnostic data set.

In this case, the data set generating unit may be designed, in particular, for modifying the second diagnostic data set only when the ascertained modification data set is statistically significant, i.e., when the probability that the differences between the ascertained modification data set and the second data set to which those first data sets are assigned from which the modification data set has been generated have randomly occurred is not above a predefined threshold, which is referred to as a "significance level," of 0.05, for example.

In this case, the statistical significance takes into account the number of first diagnostic data sets, from which the modification data set has been ascertained, and the consistency of the diagnostic data and diagnostic results in these first diagnostic data sets.

In one specific embodiment, the data set generating unit is designed for generating the third diagnostic data set on the basis of all the first data sets, which are assigned to the second diagnostic data set, and, a) on the basis of all the first data sets, which are assigned to the second diagnostic data set, ascertaining values for the individual diagnostic variables of the second diagnostic data set, in order to generate a first test data set;

b) by adding or removing diagnostic variables from the second diagnostic data set, generating one or multiple further test data sets and assigning values to the diagnostic variables of the further test data sets on the basis of all the first data sets, which are assigned to the second diagnostic data set; and c) by utilizing methods of statistical model selection, selecting that test data set from the test data sets as the new third data set, which has the highest statistical significance relative to all the first data sets, which are assigned to the second diagnostic data set.

The methods of statistical model selection may include, in particular, the Kullback-Leibler divergence method, methods of logistic regression and/or graphical models.

The workshop diagnostic system therefore becomes a self-learning system, which modifies the diagnostic data sets predefined in the second database by human authors on the basis of an evaluation of the case data of the carried-out diagnoses, in order to improve the diagnostic results. New cause-effect relationships, which have been overlooked or underestimated by the human authors, may also be detected and incorporated into the system. In addition, cause-effect relationships, which are predefined by the authors and have proven to be irrelevant in practical application, may be removed, in order to reduce the risk of misdiagnoses.

A first, second, or third diagnostic result may each include at least one indication of a component detected as defective and/or suggestions for further test steps to be carried out, in order to provide the user with specific handling instructions for the further diagnosis and/or repair.

In one specific embodiment, the first database is designed in such a way that it receives first diagnostic data sets from a large number of different diagnostic testers. In this way, diagnostic data from a large number of diagnostic testers, which are preferably utilized in a plurality of different workshops, may be gathered and stored in the first database, in order to create a broad basis for a reliable statistical evaluation of the diagnostic data.

DETAILED DESCRIPTION

Figure 1:
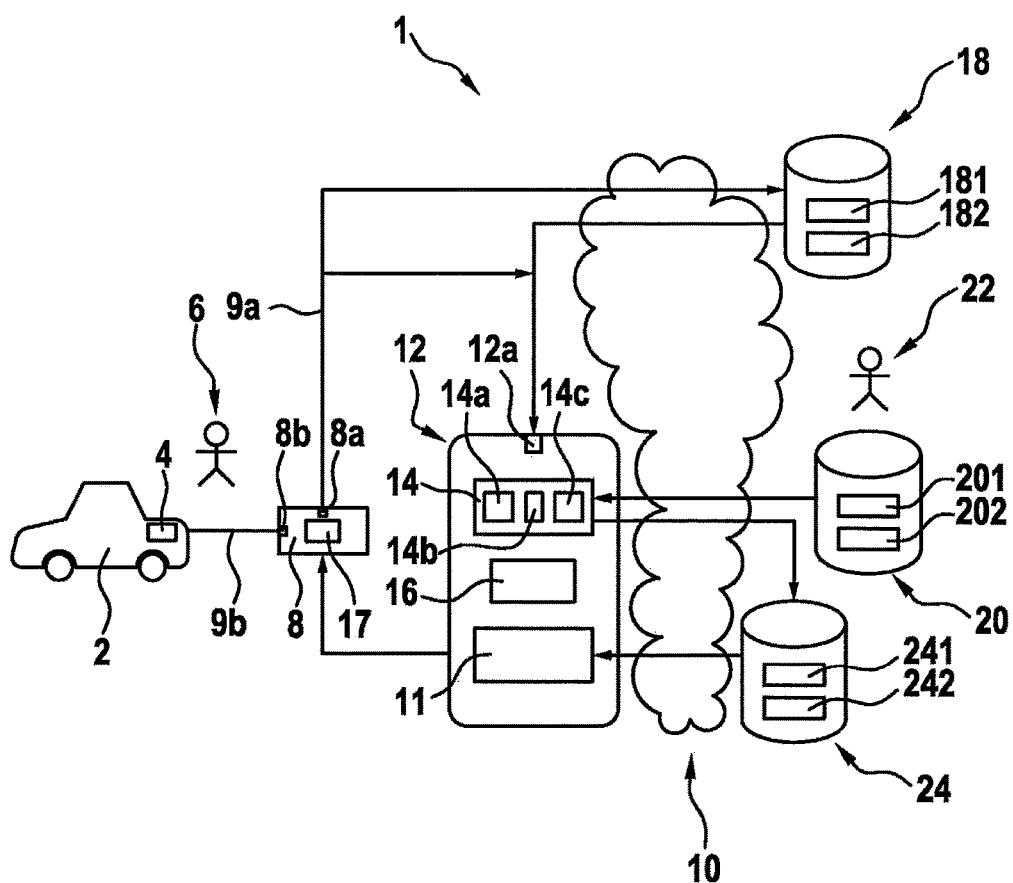
FIG. 1 schematically shows the configuration of a workshop diagnostic system according to the present invention.

FIG. 1 schematically shows the configuration of a workshop diagnostic system 1 according to the present invention.

A workshop diagnostic system 1 according to the present invention includes at least one diagnostic tester 8 having a vehicle communication device 8b, which may be brought into a communication link 9b with a vehicle communication interface (VCI) 4 of a vehicle 2 by a mechanic 6, in order to carry out a vehicle diagnosis. In this case, communication link 9b may be established, in particular, via a cable or plug connection or wirelessly, e.g., via a WLAN or Bluetooth®.

Diagnostic tester 8 also includes a transmission unit 8a, which is designed for communicating with a first database ("case database") 18 and/or a server 12 via a further communication link 9a, which may likewise be designed to be wired or wireless and, in particular, may also include Internet 10, and for transmitting at least a portion of the data, which have been read out of vehicle communication interface 4 by diagnostic tester 8 and which may be relevant for a diagnosis.

Diagnostic tester 8 may also be designed for transmitting, to first database 18, additional data, which have been stored in the diagnostic tester and/or which have been manually entered into diagnostic tester 8 by mechanic 6, and/or modified data, which are based on data read out of vehicle communication interface 4, but which have been modified in diagnostic tester 8, e.g., via a user input by mechanic 6.

First database 18 has a communication link, e.g., via Internet 10, with an evaluation unit 14, which may be implemented, in particular, in a diagnostic server 12.

A server receiver 12a of diagnostic server 12 receives first diagnostic data sets 181, 182 from first database 18 and, additionally, second diagnostic data sets 201, 202 from a second database 20 ("author database"), which has been filled with data by one or multiple human authors 22, and likewise has a communication link, e.g., via Internet 10, with diagnostic server 12 and, in particular, evaluation unit 14. In one possible exemplary embodiment, server receiver 12a may also receive data directly from diagnostic tester 8.

Server receiver 12a forwards the received data to evaluation unit 14.

Evaluation unit 14 includes, in particular, an assignment unit 14a, a memory unit 14b, and a data set generating unit 14c.

Assignment unit 14a is designed for comparing the diagnostic data and/or the diagnostic result of one of first diagnostic data sets 181, 182 from first database 18 with the diagnostic data and/or the diagnostic result of second diagnostic data sets 201, 202 predefined in second database 20 and for assigning to particular first diagnostic data set 181, 182 one of the predefined second diagnostic data sets 201, 202 having the greatest similarity to particular first diagnostic data set 181, 182 according to the comparison. The assignment carried out by assignment unit 14a is stored in memory unit 14b.

Data set generating unit 14c is designed for modifying particular assigned second diagnostic data set 201, 202 on the basis of all first diagnostic data sets 181, 182 which are assigned to this second diagnostic data set 201, 202 in order to generate at least one third diagnostic data set 241, 242, each third diagnostic data set 241, 242 including a particular set of third diagnostic data and at least one third diagnostic result assigned to the set of third diagnostic data.

Third diagnostic data sets 241, 242 generated in this way are stored in a third database 24 ("diagnostic database"), which likewise has a communication link, e.g., via Internet 10, with diagnostic server 12.

In this way, workshop diagnostic system 1 is designed as a self-learning system, which modifies second diagnostic data sets 201, 202, which are predefined in second database 20 by human authors, on the basis of an evaluation of the case data of the carried-out diagnoses stored in first diagnostic data sets 181, 182, in order to improve the diagnostic results.

As a result, new cause-effect relationships, which have been overlooked or underestimated by the human authors when generating second diagnostic data sets 201, 202 in second database 20, may be detected and incorporated into the system. In addition, cause-effect relationships, which are predefined by authors 22 and which have proven to be irrelevant in practical application, may be removed, in order to reduce the risk of misdiagnoses.

On the basis of the cause-effect relationships, which are included in third diagnostic data sets 241, 242 stored in third database 24, a diagnostic result is displayed to mechanic 6 on a display device 16 of diagnostic server 12 and/or on a display device 17 of diagnostic tester 8 by a diagnostic unit 11, which is designed for evaluating third data sets 241, 242 stored in third database 24, in order to support the troubleshooting on the technical object on the basis of at least one of third diagnostic data sets 241, 242 and, in particular, for generating suggestions for further diagnostic and repair steps, such as, e.g., replacing at least one defective component.

Mechanic 6 may read out the suggested further diagnostic and/or repair steps and/or indications of at least one possibly defective component of vehicle 2 from at least one display device 16, 17 and carry out the suggested measures.

First database 18, second database 20, and third database 24 are typically not assigned to only a single diagnostic server 12, which is installed in a single workshop. Instead, first database 18, second database 20, and third database 24 are generally connected via suitable data connections, in particular Internet 10, to a plurality of similarly configured diagnostic servers 12 (which are not shown in FIG. 1), which are installed in one or multiple workshops, so that diagnostic data from multiple workshops are gathered and made available in first database 18 and third database 24.

In this way, data on a plurality of repair procedures are gathered from various workshops in first database 18 and third database 24, and a sufficiently large inventory of diagnostic data is created, which makes it possible to statistically evaluate first data sets 18$_1$, 18$_2$ stored in first database 18 and to carry out a vehicle diagnosis and suggest suitable further diagnostic and/or repair steps on the basis of the results of the statistical evaluation of stored first data sets 18$_1$, 18$_2$.

Figure 2:
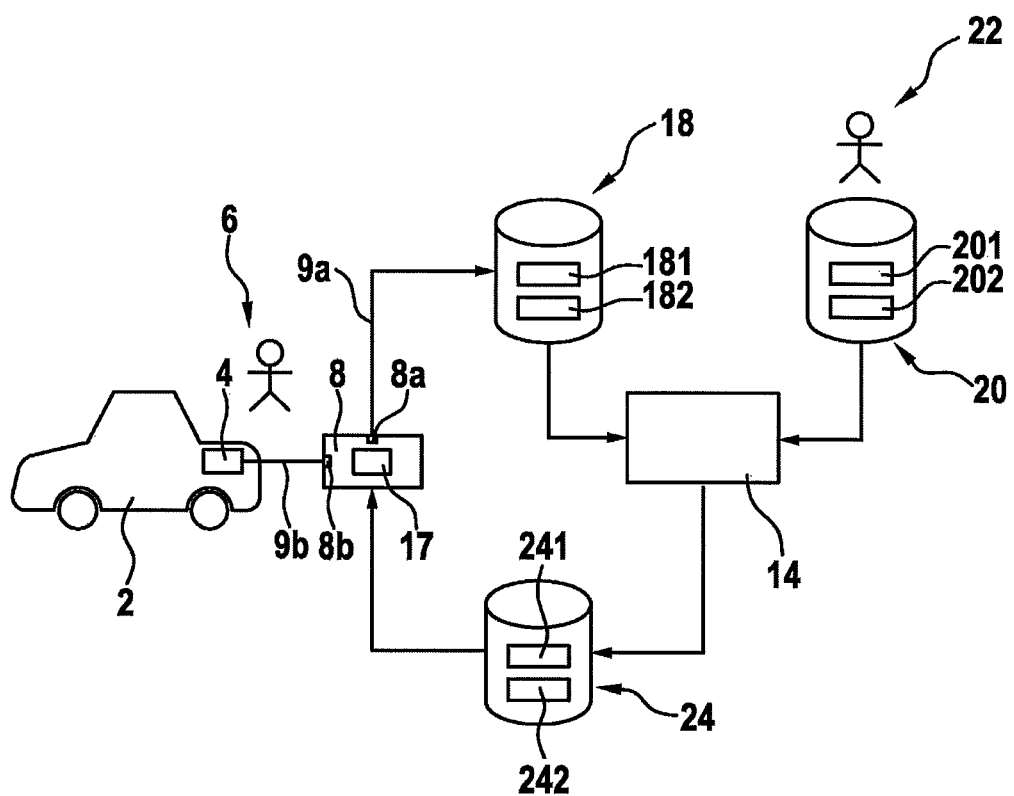
FIG. 2 schematically shows the sequence, according to the present invention, of a vehicle diagnosis utilizing processed cause-effect relationships.

FIG. 2 schematically shows the sequence of a vehicle diagnosis utilizing a workshop diagnostic system according to the present invention.

The vehicle diagnostic data read out from a vehicle communication interface ("VCI") 4 by diagnostic tester 8 via a vehicle communication device 8$b$ are transmitted by transmission unit 8$a$ to first database 18, stored in first database 18 as first data sets 18$_1$, 18$_2$, and made available to evaluation unit 14.

Second data sets 20$_1$, 20$_2$ having cause-effect relationships between vehicle diagnostic data of the type made available by diagnostic tester 8 from vehicle communication interface 4, and possible faults, including suggestions for further test, diagnostic, and/or repair steps were previously stored in second database 20 by human authors 22.

Evaluation unit 14 evaluates the data obtained from first database 18 by utilizing the cause-effect relationships, which have been drawn from second database 20, and makes third data sets 24$_1$, 24$_2$ having processed cause-effect relationships available in third database 24.

Workshop diagnostic system 1 also includes a diagnostic unit 11, which is designed for evaluating third data sets 24$_1$, 24$_2$ stored in third database 24, in order to support the troubleshooting on the technical object on the basis of at least one of the third diagnostic data sets 24$_1$, 24$_2$ and, in particular, for generating suggestions for further diagnostic and repair steps, such as, e.g., replacing at least one defective component, and making these suggestions available to mechanic 6 via at least one of the display devices 16, 17.

Optionally, diagnostic tester 8 may also be designed in such a way that it is controllable by diagnostic system 1 and, optionally, after approval by mechanic 6 carrying out the diagnosis, connects to vehicle communication interface 4, in order to automatically carry out further diagnostic steps on vehicle 2.

What is claimed is:

1. A workshop diagnostic system for supporting a troubleshooting on a technical object, comprising:
   at least one diagnostic tester receiving first diagnostic data, measured by at least one object control device;
   at least one diagnostic server, wherein:
      the diagnostic tester includes:
         at least one object communication device for receiving the first diagnostic data from the at least one object control device of the technical object, and
         at least one transmission unit for transmitting the first diagnostic data to the diagnostic server;
      at least one of the diagnostic tester and the diagnostic server forms, from the first diagnostic data, at least one set of first diagnostic data that includes at least a portion of the first diagnostic data, and
      at least one of the diagnostic tester and the diagnostic server assigns at least one first diagnostic result to the set of first diagnostic data;
   a first database for storing first diagnostic data sets generated in the course of successive diagnoses, each of the first diagnostic data sets including a set of first diagnostic data and the at least one first diagnostic result assigned to the set of first diagnostic data;
   a second database for storing predefined second diagnostic data sets, each of the second diagnostic data sets including a set of second diagnostic data and a second diagnostic result assigned to the set of second diagnostic data;
   an evaluation system including an assignment unit for comparing at least one of diagnostic data and diagnostic result of one of the first diagnostic data sets with at least one of diagnostic data and diagnostic result of the second diagnostic data sets and assigning to the first diagnostic data set one of the predefined second diagnostic data sets having the greatest similarity to the first diagnostic data set according to the comparison;
   a memory unit for storing the assignment carried out by the assignment unit;
   a data set generating unit for modifying the assigned second diagnostic data set on the basis of all first diagnostic data sets, which are assigned to this second diagnostic data set, in order to generate at least one third diagnostic data set, each third diagnostic data set including a particular set of third diagnostic data and at least one third diagnostic result assigned to the set of third diagnostic data; and storing the third diagnostic data set in a third database; and
   a diagnostic unit for supporting the troubleshooting on the technical object on the basis of at least one third diagnostic data set.

2. The workshop diagnostic system as recited in claim 1, wherein the technical object includes a motor vehicle.

3. The workshop diagnostic system as recited in claim 1, wherein the first, second, and third diagnostic data each include at least one diagnostic variable and at least one value assigned to the diagnostic variable.

4. The workshop diagnostic system as recited in claim 3, wherein:
   at least one of the assignment unit and the data set generating unit is designed in such a way that numerical differences between values of corresponding diagnostic data of the data sets to be processed are calculated and at least one of the assignment of a first diagnostic data set to a second diagnostic data set and the modification of a second diagnostic data set is carried out on the basis of the numerical differences, and
   corresponding diagnostic data are diagnostic data which contain the same diagnostic variables.

5. The workshop diagnostic system as recited in claim 4, wherein at least one of the assignment unit and the data set generating unit calculates, in each case, a mean of the numerical differences as a comparative value.

6. The workshop diagnostic system as recited in claim 5, wherein the mean is a weighted mean.

7. The workshop diagnostic system as recited in claim 3, wherein at least one of the assignment unit and the data set generating unit calculates a numerical difference between the diagnostic results of the two data sets on the basis of a predefined metric that defines a numerical distance between two diagnostic results in each case.

8. The workshop diagnostic system as recited in claim 3, wherein the data set generating unit is designed to generate the third diagnostic data set on the basis of all the first data sets, which are assigned to the second diagnostic data set, and
   a) on the basis of all the first data sets, which are assigned to the second diagnostic data set, ascertaining values for the individual diagnostic variables of the second diagnostic data set, in order to generate a first test data set;
   b) by adding or removing diagnostic variables from the second diagnostic data set, generating one or multiple further test data sets and assigning values to the diagnostic variables of the further test data sets on the basis of all the first data sets, which are assigned to the second diagnostic data set; and
   c) by utilizing methods of statistical model selection, selecting that test data set from the test data sets as the new third data set, which has the highest statistical significance relative to all the first data sets, which are assigned to the second diagnostic data set.

9. The workshop diagnostic system as recited in claim 3, wherein the data set generating unit at least one of:
   generates the third diagnostic data set on the basis of the assigned second diagnostic data set,
   modifies the second diagnostic data set as a function of a modification data set, which has been ascertained from all the first data sets assigned to the second diagnostic data set,
   changes at least one value of at least one diagnostic variable in the second diagnostic data set, and
   at least one of:
      removes at least one diagnostic variable from the second diagnostic data set, and
      adds at least one diagnostic variable to the second diagnostic data set.

10. The workshop diagnostic system as recited in claim 9, wherein the data set generating unit modifies the second diagnostic data set only when a probability that the differences between the ascertained modification data set and the second diagnostic data set have been come about randomly is not above a predefined threshold value.

11. The workshop diagnostic system as recited in claim 1, wherein one of a first, second, and third diagnostic result each includes at least one of at least one indication of a component detected as defective and a suggestion for further test steps to be carried out.

12. The workshop diagnostic system as recited in claim 1, wherein the first database receives first diagnostic data sets from a large number of different diagnostic testers.

13. A workshop diagnostic system for supporting a troubleshooting on a technical object, comprising:
   at least one diagnostic tester receiving first diagnostic data, measured by at least on object control device;
   at least one diagnostic server, wherein:
      the diagnostic tester includes:
         at least one object communication device for receiving the first diagnostic data from the at least one object control device of the technical object, and
         at least one transmission unit for transmitting the first diagnostic data to the diagnostic server;
      at least one of the diagnostic tester and the diagnostic server forms, from the first diagnostic data, at least one set of first diagnostic data that includes at least a portion of the first diagnostic data, and
      at least one of the diagnostic tester and the diagnostic server assigns at least one first diagnostic result to the set of first diagnostic data;
   a first database for storing first diagnostic data sets generated in the course of successive diagnoses, each of the first diagnostic data sets including a set of first diagnostic data and the at least one first diagnostic result assigned to the set of first diagnostic data;
   a second database for storing predefined second diagnostic data sets, each of the second diagnostic data sets including a set of second diagnostic data and a second diagnostic result assigned to the set of second diagnostic data;
   an evaluation system including an assignment unit for comparing at least one of diagnostic data and diagnostic result of one of the first diagnostic data sets with at least one of diagnostic data and diagnostic result of the second diagnostic data sets and assigning to the first diagnostic data set one of the predefined second diagnostic data sets having the greatest similarity to the first diagnostic data set according to the comparison;
   a memory unit for storing the assignment carried out by the assignment unit;
   a data set generating unit for modifying the assigned second diagnostic data set on the basis of all first diagnostic data sets, which are assigned to this second diagnostic data set, in order to generate at least one third diagnostic data set, each third diagnostic data set including a particular set of third diagnostic data and at least one third diagnostic result assigned to the set of third diagnostic data; and storing the third diagnostic data set in a third database; and
   a diagnostic unit for supporting the troubleshooting on the technical object on the basis of at least one third diagnostic data set,
   wherein the first, second, and third diagnostic data each include at least one diagnostic variable and at least one value assigned to the diagnostic variable,
   wherein the data set generating unit generates the third diagnostic data set on the basis of the assigned second diagnostic data set, modifies the second diagnostic data set as a function of a modification data set, which has been ascertained from all the first data sets assigned to the second diagnostic data set, at least one of changes at least one value of at least one diagnostic variable in the second diagnostic data set and removes at least one diagnostic variable from the second diagnostic data set, and adds at least one diagnostic variable to the second diagnostic data set, and
   wherein a statistical significance for the ascertained modification data set is represented by a significance level $\alpha$ of 0.05.

14. The workshop diagnostic system as recited in claim 13, wherein the methods of statistical model selection include at least one of the Kullback-Leibler divergence method, methods of logistic regression, and graphical models.

15. A method for supporting a troubleshooting on a technical object, comprising:
- a diagnosing test receiving first diagnostic data, measured by at least one object control device and transmitting the data to a diagnostic server;
- forming, from particular transmitted first diagnostic data, at least one set of first diagnostic data, which includes at least a portion of the first diagnostic data, and assigning at least one first diagnostic result to the set of first diagnostic data;
- storing the first diagnostic data sets generated in the course of successive diagnoses in a first database, each of the first diagnostic data sets including a particular set of first diagnostic data and the at least one first diagnostic result assigned to the set of first diagnostic data;
- comparing at least one of the diagnostic data and the diagnostic result of each diagnostic data set of the first diagnostic data sets with at least one of the diagnostic data and the diagnostic result of predefined second diagnostic data sets, which are stored in a second database and each of which contains a set of second diagnostic data and a second diagnostic result assigned to the set of second diagnostic data and assigning to the particular first diagnostic data set one of the predefined second diagnostic data sets having the greatest similarity to the particular first diagnostic data set according to the comparison;
- storing the assignment carried out by the assignment unit;
- modifying the particular assigned second diagnostic data set on the basis of all first diagnostic data sets which are assigned to this second diagnostic data set, in order to generate at least one third diagnostic data set, each third diagnostic data set containing a particular set of third diagnostic data and at least one third diagnostic result assigned to the set of third diagnostic data;
- storing the third diagnostic data set in a third database; and
- basing the support of the troubleshooting on the technical object on at least one third diagnostic data set.

16. The workshop diagnostic method as recited in claim 15, wherein the technical object includes a motor vehicle.

* * * * *